United States Patent [19]
Cheng

[11] 3,904,987
[45] Sept. 9, 1975

[54] CAVITY DUMPING OF A LASER IN ITS UNSTABLE FREQUENCY REGIME

[75] Inventor: David Cheng, Bridgewater Twp., Somerset County, N.J.

[73] Assignee: Bell Telephone Laboratories, Incorporated, Murray Hill, N.J.

[22] Filed: June 7, 1974

[21] Appl. No.: 477,192

[52] U.S. Cl. .................. 331/94.5 Q; 331/94.5 M
[51] Int. Cl.² ........................................ H01S 3/10
[58] Field of Search ............ 331/94.5; 350/160, 161

[56] References Cited
UNITED STATES PATENTS
3,703,687  11/1972  Maydan.................. 331/94.5 M Primary Examiner—William L. Sikes
Attorney, Agent, or Firm—M. J. Urbano

[57] ABSTRACT

In U.S. Pat. No. 3,703,687 there is described an intracavity modulator for cavity dumping or Q-switching a laser at repetition rates which are outside the unstable regime defined by repetition rates near the laser relaxation oscillation frequency. Described herein is a method of cavity dumping at repetition rates in the unstable regime. The technique involves applying a holding pulse to the intracavity modulator with an amplitude such that the laser is oscillating just above threshold and with duration such that, when the holding pulse is removed, the field photons are allowed to build up to a maximum before an extraction pulse is applied.

7 Claims, 5 Drawing Figures

CAVITY DUMPING OF A LASER IN ITS UNSTABLE FREQUENCY REGIME

BACKGROUND OF THE INVENTION

This invention pertains to apparatus for modulating a laser and more particularly to apparatus for forming modulated optical pulses at repetition rates near the laser relaxation oscillation frequency.

In U.S. Pat. No. 3,703,687 issued on Nov. 21, 1972, D. Maydan describes an intracavity laser modulator in which a V-shaped resonator is utilized. The active medium of the laser is located in one leg of the V and an acousto-optic modulator is located in the other leg of the V at a position which corresponds to the beam waist. Alternatively, Maydan describes an in-line configuration, equivalent to the V-shaped resonator, in which a lens is located between the active medium and one of two resonator mirrors. The modulator is located between the lens and the one mirror and, as before, at the beam waist. With both of these configurations a pair of diffracted beams can be produced along substantially collinear paths by applying a suitable signal (e.g., extraction pulse) to the modulator. The path of the diffracted beams is sufficiently separated from the undiffracted beam that it can be extracted from the laser cavity without affecting the undiffracted portion of the beam. When the signal applied to the modulator comprises a series of pulses of radio frequency power, the diffracted laser beams are comprised of a series of pulses of electromagnetic (optical) radiation. Because the power in the diffracted beams is directly proportional to the power in the radio frequency signal applied to the modulator, the power in the diffracted beams is readily modulated by modulating the radio frequency signal.

As pointed out in the patent, the two embodiments of the Maydan intracavity modulator can be used to dump the energy in a laser, of the type which can ordinarily be Q-switched at full power in the cavity dumping mode at repetition rates as low as approximately 125 kHz. In addition, such lasers can also be Q-switched at repetition rates of approximately 30 kHz or lower. Between the upper limit of the Q-switching mode of operation and the lower limit of the cavity dumping mode Maydan points out that such lasers are unstable.

The nature of this instability is further described in a paper by Maydan and R. B. Chesler entitled "Q-Switching and Cavity Dumping of Nd:YAlG Lasers", *Journal of Applied Physics*, Vol. 42, No. 3, pages 1031–1034 Mar. 1, 1971). It should be noted, however, that the unstable regime defined by the range of 30 to 125 kHz is specifically applicable only to Nd:YAG lasers having a particular configuration which gives rise to a laser relaxation frequency $\omega_r$ of about 50 kHz. In general, the laser relaxation frequency and the range of the unstable regime is different for different active media and/or different laser designs. Thus, the relaxation oscillation frequency of a laser can be written as follows:

$$\omega_r = \sqrt{\frac{p-1}{\tau_c \tau_3}}$$

where $p$, the pumping ratio, is equal to $P/P_{th}$; $P$ is the pump power; $P_{th}$ is the threshold pump power; $\tau_3$ is the upper laser level (level 3 of a 4-level system) storage time constant (i.e., lifetime); $\tau_c$, the cavity build-up time constant, equals $$\frac{2L}{c} \cdot \frac{1}{\alpha} ; \frac{2L}{c}$$

is the photon round-trip time; and $\alpha$ is photon round-trip loss. In analyzing a laser to determine whether or not cavity dumping is feasible, it is necessary to take into account not only the laser relaxation frequency $\omega_r$, which defines generally where the onset of oscillations will occur, but also the damping factor , which determines how quickly the oscillations are attenuated. In gas lasers such as helium-neon and argon, for example, both $\omega_r$ and $\gamma$ are relatively large so that operation can be achieved at or near $\omega_r$ because any oscillations which occur are quickly damped (e.g., in less than 1 cycle). In solid state lasers such as Nd:YAG, on the other hand, $\omega_r$ and $\gamma$ are relatively low so that the tendency to oscillate is much greater (e.g., tens or hundreds of cycles occur before the oscillations are damped out).

The nature of the unstable regime is also discussed in the aforementioned article in *Journal of Applied Physics*. That is, after a cavity dumping (i.e., extraction) pulse is applied to the modulator, the cavity photon field must be built up from a very low level (i.e., from noise). If this level is extremely small, as in the case of an emptied cavity, instability arises due to variations in photon build-up statistics.

SUMMARY OF THE INVENTION

In order for the laser to be stable, a controlled finite number of photons should be left in the cavity after dumping. In accordance with one embodiment of the invention, the onset of relaxation oscillations is reduced or delayed by a holding pulse applied to the intracavity modulator after a beam extraction pulse, and the next succeeding extraction pulse is applied to the modulator at an appropriate time after the removal of the holding pulse. During the holding period, the holding pulse introduces a controlled loss into the cavity which keeps the laser oscillating just above threshold. The build-up period is relatively long and the number of cavity photons is large enough to effectively eliminate statistically induced instabilities. The controlled loss is then removed and the inversion photons are allowed to couple to the field to cause a rapidly circulating power build-up just prior to dumping by the next extraction pulse. The entire procedure is then repeated. Because pumping energy is stored during the holding period, the output power is comparable to that obtained by cavity dumping at high repetition rates and Q-switching at low repetition rates as described in the Maydan patent.

BRIEF DESCRIPTION OF THE DRAWINGS

The invention, together with its various features and advantages, can be easily understood from the following more detailed description taken in conjunction with the accompanying drawing, in which.

DETAILED DESCRIPTION

To the extent necessary to supplement this disclosure, the aforementioned U.S. Pat. No. 3,703,687 of D. Maydan is incorporated herein by reference.

Figure 1:
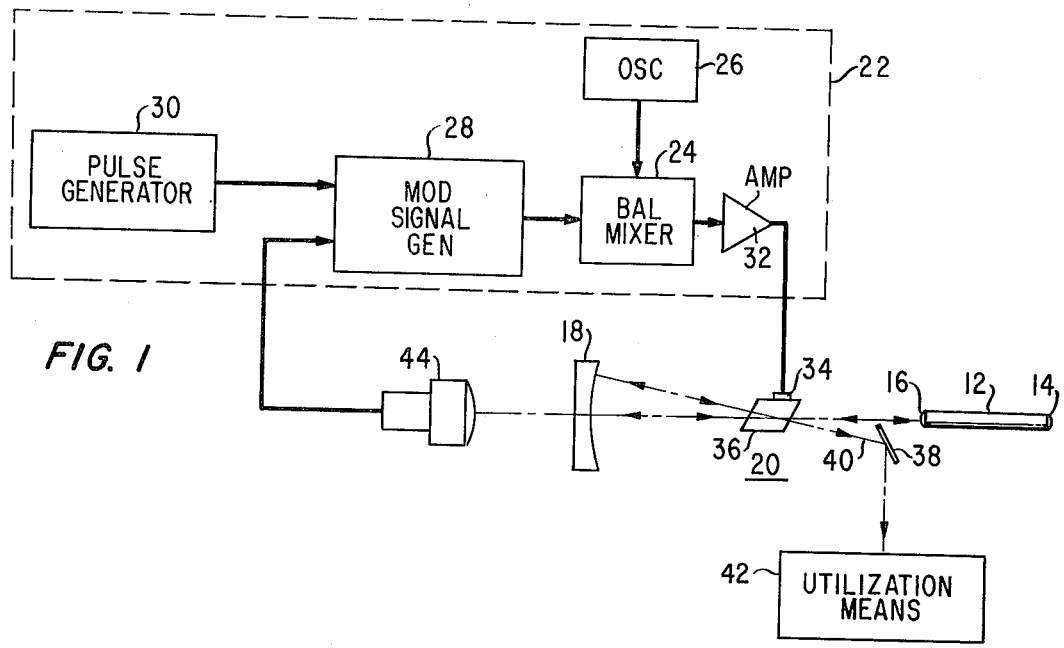
FIG. 1 is a schematic of an illustrative embodiment of my invention.

Turning now to FIG. 1, there is shown an illustrative embodiment of the invention for cavity dumping a Nd:YAG (or equivalently Nd:YAlG) laser in its unstable regime. The laser comprises an active medium formed, for example, by an Nd:YAG rod 12 having a convex mirror 14 formed by machining a curved surface on one end of the rod. In a similar fashion a convex lens 16 is formed on the opposite end of the rod. Other active media such as Nd:YAlO are also suitable. A cavity resonator is formed by the combination of convex mirror 14 and a concave mirror 18. This concave-convex resonator is of the type described by R. B. Chesler and D. Maydan in a paper entitled "Convex-Concave Resonators for $TEM_{00}$ Operation of Solid-State Ion Lasers", *Journal of Applied Physics*, Vol. 43, No. 5, pages 2254–2257 (May 1972). An intracavity modulator 20 is disposed on the resonator axis between mirror 18 and lens 16. The modulator 20 is positioned at the center of curvature of mirror 18 and at the beam waist in a fashion analogous to the in-line configuration of FIG. 2 of the aforementioned Maydan patent.

Figure 2A:
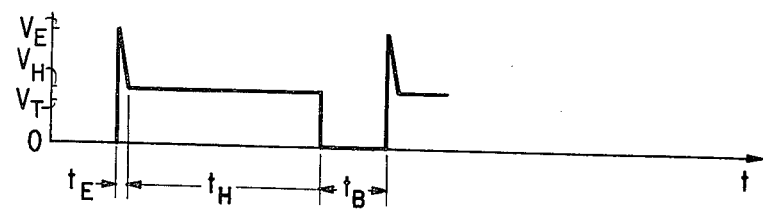
FIG. 2A shows an illustrative waveform of the pulses applied to the intracavity modulator of FIG. 1.
Figure 3A:
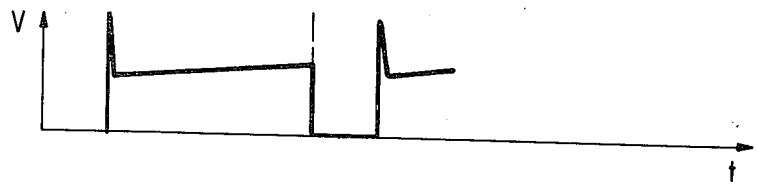
FIG. 3A shows an alternative waveform applied to the intracavity modulator of FIG. 1.

The modulator 20 is driven by an electric signal generated by signal forming means 22 which illustratively comprises a balanced mixer 24 (or microwave switch) which has one of its inputs connected to an oscillator 26 and the other to a modulation signal generator 28. The modulation signal generator 28 is driven by an extraction pulse generator 30. The output of the balanced mixer 24 is amplified by r.f. amplifier 32 before it is applied to modulator 20. All of the apparatus of the signal forming means 22 may be standard. Illustratively, oscillator 26 is a 2 mW, 450 c.w. oscillator. The signal from extraction pulse generator 24 typically consists of a series of fast, amplitude modulated radio frequency pulses at a high repetition rate. Amplifier 32 illustratively is capable of delivering 20 watts peak power onto a 50 ohm load. The modulation signal generator 28 produces a holding pulse after each extraction pulse produced by generator 30. Illustratively, waveforms applied to the modulator 20 by the signal forming means 22 are shown in FIGS. 2A and 3A to be described more fully hereinafter.

Energy extracting means for the laser can be defined as comprising modulator 20, signal forming means 22 and mirror 38 which deflects the beam formed by modulator 20 along path 40 to utilization means 42. The utilization means can be any system in which modulated optical radiation can be used. For example, the system could be a laser machining system, an optical memory, or an optical communication system that uses modulated radiation for machining, memory writing or reading, or communicating information. A specific use of the invention is the micrographics system described in U.S. Pat. No. 3,720,784 granted to D. Maydan et al on Mar. 13, 1973.

The modulator 20 typically is an an acousto-optic modulator comprising a zinc oxide transducer 34 and a block 36 of fused silica either cut at the Brewster angle as shown or provided with a dielectric thin film coating to minimize optical reflections at the interfaces. Block 36 is oriented so that acoustic waves in the modulator propagate in a direction substantially perpendicular to the direction of propagation of incident optical radiation emanating from rod 12. Other acousto-optic modulators such as paratellurite or lead molibdate are also suitable as well as other types of modulators such as those which are electrooptic.

In operation, rod 12 is pumped by means not shown to produce a beam of optical radiation that is reflected back and forth at very low loss between concave mirror 18 and convex mirror 14 of the resonator. This beam passes through the modulator 20 twice in each round trip of the resonator. While the beam is being reflected between the mirrors, the extraction and holding pulses from signal forming means 22 are applied to modulator 20. As described in the Maydan U.S. Pat. 3,703,687, the interaction between the optical beam and the acoustic waves produces a pair of diffracted optical beams which are collinear with one another along path 40. These diffracted beams propagate along path 40, which is oriented at an acute angle to the resonator axis, and are reflected by mirror 38 to utilization means 42.

As mentioned previously, the invention is particularly adapted for use in the unstable regime of operation as defined by the aforementioned Maydan U.S. Pat. No. 3,703,687 and the *Journal of Applied Physics* paper dated Mar. 1, 1971. In particular, when the repetition rate of the extraction pulses generated by signal forming means 22 is at or near the laser relaxation oscillation frequency $\omega_r$, then a waveform of the type shown in FIG. 2A should be applied to modulator 20. In general, the waveform shown in FIG. 2A comprises a short duration ($t_E$) extraction pulse of amplitude $V_E$ followed by a holding pulse of constant amplitude $V_H$ and duration $t_H$ which is terminated prior to the application of the next succeeding extraction pulse. The interval between the trailing edge of the holding pulse and the leading edge of the extraction pulse is the build-up period of duration $t_B$. As is known in the art $V_E$ is preferably chosen to maximize the efficiency of extraction of modulator 20.

Figure 2B:
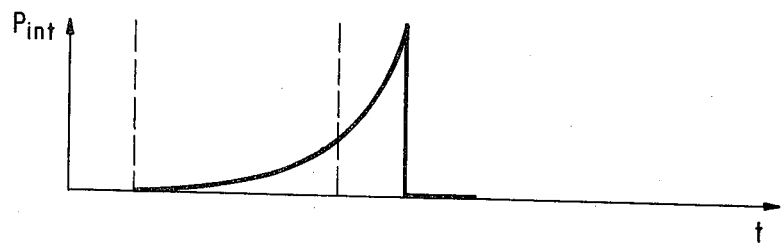
FIG. 2B shows the build-up with time of intracavity power when the waveform of FIG. 2A is applied to the intracavity modulator of FIG. 1.

The effect of the holding pulse is to reduce the relaxation oscillation frequency; i.e., the onset of relaxation oscillations is reduced or delayed for a period of time $t_H$ which thereby defines the build-up period $t_B$ after which the extraction pulse should be applied. As mentioned previously, during the holding period $t_H$ the holding pulse introduces a controlled loss in the cavity via the modulator 20 which keeps the laser oscillating above threshold (because $V_H$ is slightly greater than the laser threshold $V_T$). This type of waveform provides a relatively long build-up period $t_B$ so that the number of cavity photons is large enough to effectively eliminate statistically induced instabilities. At the end of the holding period $t_H$, the voltage applied by signal forming means 22 drops to zero (i.e., the controlled loss is removed) and the inversion photons are allowed to couple to the field to cause a rapid circulating power build-up (as shown in FIG. 2B) just prior to the application of the next extraction pulse. The entire procedure is then repeated.

Figure 3B:
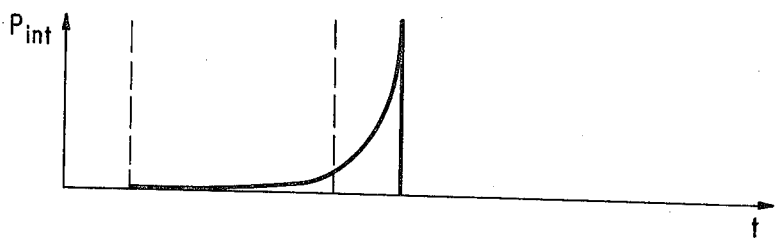
FIG. 3B shows the build-up with time of intracavity power when the waveform of FIG. 3A is applied to the intracavity modulator of FIG. 1.

As shown in FIG. 2B, the internal power of the laser resonator during the holding period $t_H$ is not constant, rather it increases slightly although the amount of increase is exaggerated in FIG. 2B for the purposes of illustration. In addition, because the internal power is increasing rapidly at the end of the holding period, jitter in the trailing edge of the holding pulse can introduce instabilities in the optical pulses coupled to utilization means 42. In order to ameliorate these effects the internal power should be kept relatively low during the holding period as shown in FIG. 3B. This end can be accomplished by adjusting the slope of the holding pulse so that there is an increased coupling (between the inversions and field photons) produced by the increased population inversion. Adjustment of the slope of the holding pulse can be obtained by means of a servo loop or feedback path shown in FIG. 1. More specifically, the concave mirror 18 is made to be partially transmissive so that a portion of the beam passes therethrough to a detector such as photomultiplier 44. The output of the photomultiplier 44 is in turn connected to modulation signal generator 28 of signal forming means 22 in order to adjust the slope of the holding pulse. Of course, the specific electronic circuitry required to adjust the slope and generate the holding pulses is well known in the art and consequently is omitted here in the interests of simplicity. The effect of the servo loop is to maintain the internal power at a relatively low level during the holding period by continuously correcting the modulating loss in step with the internal power as detected by the photomultiplier 44.

In a specific example of the embodiment of the invention shown in FIG. 1 (without feedback), the Nd:YAG rod 12 was pumped by means of a tungsten-halogen lamp at 120V and 500 watts to generate c.w. radiation at 1.06 $\mu$m. The rod 12 was cylindrical in shape, about 67 mm long and 2.5 mm in diameter. The modulator comprised a fused silica block 36 which measured about one quarter inch cubed with the input and output faces cut at Brewster's angle. The transducer 34 comprised zinc oxide.

The resonator length was about 18 cm and the modulator was separated from mirror 18 by a distance of about 2.5 cm. The radius of curvature of mirror 18 was about 2.5 cm and that of mirror 14 was about $-100$ cm. On the other hand, the radius of curvature of the lens 16 formed on the interior end of the rod 12 was about 8 cm.

The laser so defined had a relaxation frequency $\omega_r$ equal to about 50 kHz. The unstable regime extended approximately from 30 to 125 kHz. The other parameters of the laser were as follows: $p = 3$, $\tau_3 = 230$ $\mu$sec, $\tau_c = 0.1$ $\mu$sec, $(2L/c) = 2$ $\mu$sec, and $\alpha = 2$ percent.

The signal forming means 22 was adjusted to generate a waveform of the type shown in FIG. 2A and had the following approximate parameter values: $V_E = 150$ mV, $V_T$ was slightly less than 50 mV which corresponds to a lamp voltage of about 90 V, $V_H = 50$ mV, $t_H = 21$ $\mu$sec, $t_B = 2.3$ $\mu$sec, and $t_E = 100$ nsec. The foregoing voltages were those applied to the input of the r.f. amplifier 32.

The repetition rate of the extraction pulses was about 42 kHz and the output delivered to the utilization means 42 was in the form of stable pulses having an average power of about 100 mW and a duration of about 25 nsec. Similar experiments were performed at other extraction pulse repetition rates in the range of 30 to 125 kHz, and it was found that when suitable holding pulse waveforms were applied after the extraction pulses in accordance with the foregoing teachings, the output of the laser was stable. In general, a suitable voltage and duration of the holding pulse is determined empirically by observing the output pulses directly. For instance, in the foregoing example when an improper holding pulse waveform (e.g., $t_H = 16$ $\mu$sec and $t_B = 7$ $\mu$sec) was applied following the extraction pulses, the output was unstable.

It is to be understood that the above-described arrangements are merely illustrative of the many possible specific embodiments which can be devised to represent application of the principles of the invention. Numerous and varied other arrangements can be devised in accordance with these principles by those skilled in the art without departing from the spirit and scope of the invention. In particular, the extraction and holding pulses shown in FIGS. 2A and 3A can be separated from one another by a short interval (e.g., 2 $\mu$sec for an extraction pulse period of 20 $\mu$sec) instead of being part of a single pulse entity.

What is claimed is:

1. Optical apparatus comprising
    a laser including an optical resonator and an active medium disposed therein,
    means for pumping said medium to generate a beam of optical radiation,
    modulator means located within said resonator and approximately at the waist of said beam,
    signal forming means for applying a periodic train of extraction pulses to said modulator to cause output pulses of optical radiation to exit from said resonator,
    said laser having an unstable regime of operation wherein the amplitude and/or timing of said output pulses is random when the repetition rate of said extraction pulses is at or near the relaxation oscillation frequency of said laser, characterized in that said laser is operating in said regime, and
    said signal forming means includes means for applying to said modulator, after each extraction pulse is applied thereto, a holding pulse having an amplitude effective to keep said laser operating slightly above its threshold and having a duration so that after said holding pulse is removed, the internal power in said resonator is allowed to build up to approximately maximum before the next succeeding extraction pulse is applied to said resonator, so that said output pulses are stable in both amplitude and timing.

2. The apparatus of claim 1 wherein said modulator is an acousto-optic modulator.

3. The apparatus of claim 1 wherein said active medium comprises Nd:YAG.

4. The apparatus of claim 3 wherein said laser has a relaxation oscillation frequency of approximately 50 kHz and said unstable regime extends from about 30 kHz to about 125 kHz.

5. The apparatus of claim 1 including feedback means connected to said signal forming means and responsive to the internal power in said resonator for adjusting the slope of said holding pulse so that during said holding pulse the internal power in said resonator is maintained at a relatively low level as compared to the level of internal power which would exist in the absence of said feedback means.

6. The apparatus of claim 5 wherein said feedback means is effective to produce an increasing slope with increasing time of said holding pulse.

7. An optical device comprising:
a laser including an active medium,
a means for pumping said medium to generate a beam of electromagnetic radiation,
an optical cavity resonator comprising at least first and second reflectors, said medium being located within said resonator and on an optic axis thereof, said cavity resonator having a geometry such that the beam of radiation has a waist in a region near the center of curvature of said second reflector, and
modulator means located at approximately the center of curvature of said second reflector,
signal forming means for applying a periodic train of extraction pulses to said modulator means to cause output pulses of optical radiation to exit from said resonator,
said laser having an unstable regime of operation wherein the amplitude and/or timing of said output pulses is random when the repetition rate of said extraction pulses is at or near the relaxation oscillation frequency of said laser, characterized in that said laser is operating in said regime, and
said signal forming means includes means for applying to said modulator means, after each extraction pulse is applied thereto, a holding pulse having an amplitude effective to keep said laser operating slightly above its threshold and having a duration so that, after said holding pulse is removed, the internal power in said resonator is allowed to build up to approximately maximum before the next succeeding extraction pulse is applied to said resonator, so that said output pulses are stable in both amplitude and timing.

* * * * *

UNITED STATES PATENT AND TRADEMARK OFFICE
CERTIFICATE OF CORRECTION

PATENT NO. : 3,904,987
DATED : June 7, 1974
INVENTOR(S) : David Cheng

It is certified that error appears in the above-identified patent and that said Letters Patent are hereby corrected as shown below:

Column 2, line 14, after "factor" insert -- $\gamma$ --.

Column 3, line 46, after "450" add --MHz--.

Signed and Sealed this seventeenth Day of February 1976

[SEAL]

Attest:

RUTH C. MASON
*Attesting Officer*

C. MARSHALL DANN
*Commissioner of Patents and Trademarks*